US012730972B2

(12) United States Patent
Luciano et al.

(10) Patent No.: US 12,730,972 B2
(45) Date of Patent: Sep. 8, 2026

(54) ADAPTIVE CHUNKING

(71) Applicant: Micro Focus LLC, Wilmington, DE (US)

(72) Inventors: Adam Luciano, Austin, TX (US); Vijay Mullangi, Bengaluru (IN); Arun Sharma, Bangalore (IN)

(73) Assignee: Micro Focus LLC, Wilmington, DE (US)

( * ) Notice: Subject to any disclaimer, the term of this patent is extended or adjusted under 35 U.S.C. 154(b) by 169 days.

(21) Appl. No.: 18/822,465

(22) Filed: Sep. 2, 2024

(65) Prior Publication Data

US 2025/0322165 A1 Oct. 16, 2025

(30) Foreign Application Priority Data

Apr. 12, 2024 (IN) ............................ 202411029657

(51) Int. Cl.
*G06F 40/00* (2020.01)
*G06F 40/289* (2020.01)

(52) U.S. Cl.
CPC .................................. *G06F 40/289* (2020.01)

(58) Field of Classification Search
CPC ............ G06N 3/08; G06N 20/00; G06N 3/04; G06N 3/044; G06N 3/02; G06N 5/04; G06N 20/10; G06N 20/20; G06N 5/025; G06N 5/01; G06N 5/00; G06N 7/01; G06N 3/045; G06N 5/042; G06N 5/046; G06N 5/045; G06N 5/043; G10L 15/16; G10L 15/1815; G10L 25/30; G10L 15/00; G10L 13/08; G10L 15/02; G06F 40/40; G06F 40/268; G06F 40/279; G06F 40/30; G06F 40/295; G06F 40/284; G06F 40/253; G06F 40/20
See application file for complete search history.

(56) References Cited

U.S. PATENT DOCUMENTS

2023/0282019 A1* 9/2023 van Rotterdam ....... G06F 16/93 382/218
2025/0272324 A1* 8/2025 Xu ...................... G06F 16/3344
2026/0030272 A1* 1/2026 Heller ............... G06F 16/33295

OTHER PUBLICATIONS

X. Gong, R. He and Q. Peng, "Reordering of Double Pass Merging Chunking to Improve Retrieval Augmented Generation," 2024 3rd International Conference on Computer Applications Technology (CCAT), Wenzhou, China, 2024, pp. 68-78, doi: 10.1109/CCAT64370.2024.00021 (Year: 2024).*

(Continued)

*Primary Examiner* — Edgar X Guerra-Erazo
(74) *Attorney, Agent, or Firm* — Sheridan Ross P.C.

(57) ABSTRACT

Systems and methods are provided wherein document content is parsed into sentences, or other structures, and evaluated for similarity to other sentences. The similarity, such as when a consign similarity of two sentences is determined to be greater than a first threshold, is used to place similar sentences into chunks. The sentences are evaluated again based on a second threshold more restrictive than the first threshold. The threshold value is selected to produce a sufficiently flattened distribution of the sizes of the chunks. The sentences may then be re-chunked, and the chunks are then provided to an artificially intelligent language model, such as a large language model (LLM).

20 Claims, 5 Drawing Sheets

(56) References Cited

OTHER PUBLICATIONS

W. Xiao, Y. Liu, X. Li, F. Gao and J. Gu, "TKG-RAG: A Retrieval-Augmented Generation Framework with Text-chunk Knowledge Graph," 2024 25th International Arab Conference on Information Technology (ACIT), Zarqa, Jordan, 2024, pp. 1-9, doi: 10.1109/ACIT62805.2024.10877117 (Year: 2024).*

Dai et al. "Promptagator: Few-Shot Dense Retrieval From 8 Examples," arXiv, Sep. 23, 2022, 2209.11755v1, 21 pages.

Liu et al. "Lost in the Middle: How Language Models Use Long Contexts," Transactions of the Association for Computational Linguistics, 2004, vol. 12, pp. 157-173.

* cited by examiner

ADAPTIVE CHUNKING

CROSS REFERENCE TO RELATED APPLICATION

This application claims priority to India Patent Application No. 202411029657, filed Apr. 12, 2024, the entire contents of which are incorporated herein by reference.

FIELD OF THE DISCLOSURE

The invention relates generally to systems and methods for training an artificially intelligent agent on a document.

BACKGROUND

Document (or other information) chunking is the process by which automated systems, such as artificially intelligent (AI) models, parse data. The AI model looks for related information within a document. One way to determine if content is related is to determine if the content is bound by a formatting element, such as a paragraph, section, heading, etc. Alternatively, the prior art uses word count, such as to make every 100 words into a chunk.

Once the document is chunked, an AI model may compare a question to the chunks, such as by using a cosine similarity test. If the cosine similarity value is above a particular threshold, then the answer to the query is determined to be present in the particular chunk. Additional processing may then be provided in order to extract a response to the chunk. At one extreme, a large document may be chunked into a few large chunks. As a result, the searching may be resource intensive as well as more likely to be wrong (e.g., a hallucination). At the other extreme, a large document may be chunked into a large number of small chunks. As a result, the interrelationships between chunks may be lost, resulting in other incorrect answers.

Despite the benefits of the prior art, issues remain.

SUMMARY

Chunking a document or other information (e.g., an image, an audio file, a video file, a spreadsheet, an application data file, etc.) produces better results when the information used in training the AI is properly chunked. For example, if an AI model is provided with text that is chunked (e.g., parsed) logically such that the text within each chunk is closely related and the text between chunks is less closely related, then the AI will have the content and interrelationships to provide more accurate responses to questions.

Often a document will have different topics within relatively few words, such as a single paragraph or even a sentence. More problematic is the unpredictability of topics within documents. For example, one topic may be discussed in great length (e.g., many paragraphs or pages) and then insert another topic as a single sentence or sentence portion. AI models trained with such a system may become confused by such a document as the chunking fails to follow the change in topics. As a result, the AI model may produce erroneous results (e.g., hallucinate). If a particular document discussed the internal combustion engine in great detail for pages (e.g., hundreds or thousands of words), but mentioned the existence of external combustion engines, an AI model may incorrectly chunk the document and, as a result, provide an incorrect answer due to a failure to identify the change in topic.

These and other needs are addressed by the various embodiments and configurations of the present invention. The present invention can provide a number of advantages depending on the particular configuration. These and other advantages will be apparent from the disclosure of the invention(s) contained herein.

In one embodiment, a document is parsed based on common topics wherein different topics are placed in different chunks. For example, a sentence-by-sentence cosine similarity test may reveal a number of sentences have a high degree of commonality and, as a result, are placed into their own chunk. When a cosine similarity reveals another sentence is less similar (e.g., below a first threshold), that sentence is then placed into a different chunk, along with any other sentences that share the common topic.

In another embodiment, a chunk length is calculated. The calculation may be determined programmatically or in response to chunks going above threshold in size or below threshold in size. For example, a second threshold value, one that is more restrictive than the first threshold, may reveal that the commonality of a particular chunk is no longer present and, as a result, split one chunk into two chunks. In another embodiment, if the number of chunks is determined to be too large, the second threshold may be less restrictive than the first threshold.

Studies have shown certain advantages may be realized with a flat distribution of the number of chunks and the resulting characters (or tokens) within the chunks. For example, a substantially similar number of chunks have 1-100 characters, 101-200 characters, 201-300 characters, etc. Prior art models that have mostly low character chunks or high character chunks are more likely to have errors (e.g., hallucinations) related to relationships or content, respectively.

In some aspects, the techniques described herein relate to a method, including: segmenting a document into a plurality of portions; chunking each portion of the plurality of portions into one of a plurality of chunks based on a first similarity score; determining a chunk size for each chunk of the plurality of chunks; upon determining the chunk size for a first chunk of the plurality of chunks is greater than a threshold size, rechunking at least one portion of the plurality of portions into a second chunk; and providing the plurality of chunks to a large language model.

In some aspects, the techniques described herein relate to a method, wherein chunking each portion of the plurality of portions into one of the plurality of chunks based on the first similarity score further includes, chunking a first portion of the plurality of portions into one of the plurality of chunks based on the first similarity score compared to a second portion of the plurality of portions, wherein the first portion of the plurality of portions and the second portion of the plurality of portions are adjacent.

In some aspects, the techniques described herein relate to a method, wherein chunking each portion of the plurality of portions into one of the plurality of chunks based on the first similarity score further includes, chunking a first portion of the plurality of portions into one of the plurality of chunks based on the first similarity score compared to a second portion of the plurality of portions, wherein the first portion of the plurality of portions and the second portion of the plurality of portions are separated by a third portion of the plurality of portions.

In some aspects, the techniques described herein relate to a method, wherein the plurality of portions include a plurality of complete sentences.

In some aspects, the techniques described herein relate to a method, wherein the plurality of portions include at least one portion having less than all words of a complete sentence.

In some aspects, the techniques described herein relate to a method, wherein the plurality of portions include a plurality of words from at least two complete sentences.

In some aspects, the techniques described herein relate to a method, wherein the first similarity score includes a cosine similarity score.

In some aspects, the techniques described herein relate to a method, wherein: rechunking includes chunking each portion of the first chunk plurality of portions into the second chunk of the plurality of chunks based on a second similarity score that is more restrictive than the first similarity score.

In some aspects, the techniques described herein relate to a method, wherein the rechunking includes chunking each portion of the first chunk plurality of portions into a third chunk of the plurality of chunks based on a second similarity score that is more restrictive than the first similarity score.

In some aspects, the techniques described herein relate to a system, including: an input device; an output device; and a computing device including one or more processors coupled to a computer memory including instructions; and wherein the instructions cause the one or more processors to perform: segmenting a document into a plurality of portions; chunking each portion of the plurality of portions into one of a plurality of chunks based on a first similarity score; determining a chunk size for each chunk of the plurality of chunks; upon determining the chunk size for a first chunk of the plurality of chunks is greater than a threshold size, rechunking at least one portion of the plurality of portions into a second chunk; and providing the plurality of chunks to a large language model.

In some aspects, the techniques described herein relate to a system, wherein chunking each portion of the plurality of portions into one of the plurality of chunks based on the first similarity score further includes, chunking a first portion of the plurality of portions into one of the plurality of chunks based on the first similarity score compared to a second portion of the plurality of portions, wherein the first portion of the plurality of portions and the second portion of the plurality of portions are adjacent.

In some aspects, the techniques described herein relate to a system, wherein chunking each portion of the plurality of portions into one of the plurality of chunks based on the first similarity score further includes, chunking a first portion of the plurality of portions into one of the plurality of chunks based on the first similarity score compared to a second portion of the plurality of portions, wherein the first portion of the plurality of portions and the second portion of the plurality of portions are separated by a third portion of the plurality of portions.

In some aspects, the techniques described herein relate to a system, wherein the plurality of portions include a plurality of complete sentences.

In some aspects, the techniques described herein relate to a system, wherein the plurality of portions include at least one portion having less than all words of a complete sentence.

In some aspects, the techniques described herein relate to a system, wherein the plurality of portions include a plurality of words from at least two complete sentences.

In some aspects, the techniques described herein relate to a system, wherein the first similarity score includes a cosine similarity score.

In some aspects, the techniques described herein relate to a system, wherein: rechunking includes chunking each portion of the first chunk plurality of portions into the second chunk of the plurality of chunks based on a second similarity score that is more restrictive than the first similarity score.

In some aspects, the techniques described herein relate to a system, wherein the rechunking includes chunking each portion of the first chunk plurality of portions into a third chunk of the plurality of chunks based on a second similarity score that is more restrictive than the first similarity score.

In some aspects, the techniques described herein relate to a non-transitory computer readable medium including instructions that, when read by a machine, cause the machine to perform: segmenting a document into a plurality of portions; chunking each portion of the plurality of portions into one of a plurality of chunks based on a first similarity score;

determining a chunk size for each chunk of the plurality of chunks; upon determining the chunk size for a first chunk of the plurality of chunks is greater than a threshold size, rechunking at least one portion of the plurality of portions into a second chunk; and providing the plurality of chunks to a large language model.

In some aspects, the techniques described herein relate to a non-transitory computer readable medium, wherein chunking each portion of the plurality of portions into one of the plurality of chunks based on the first similarity score further includes, chunking a first portion of the plurality of portions into one of the plurality of chunks based on the first similarity score compared to a second portion of the plurality of portions, wherein the first portion of the plurality of portions and the second portion of the plurality of portions are adjacent.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
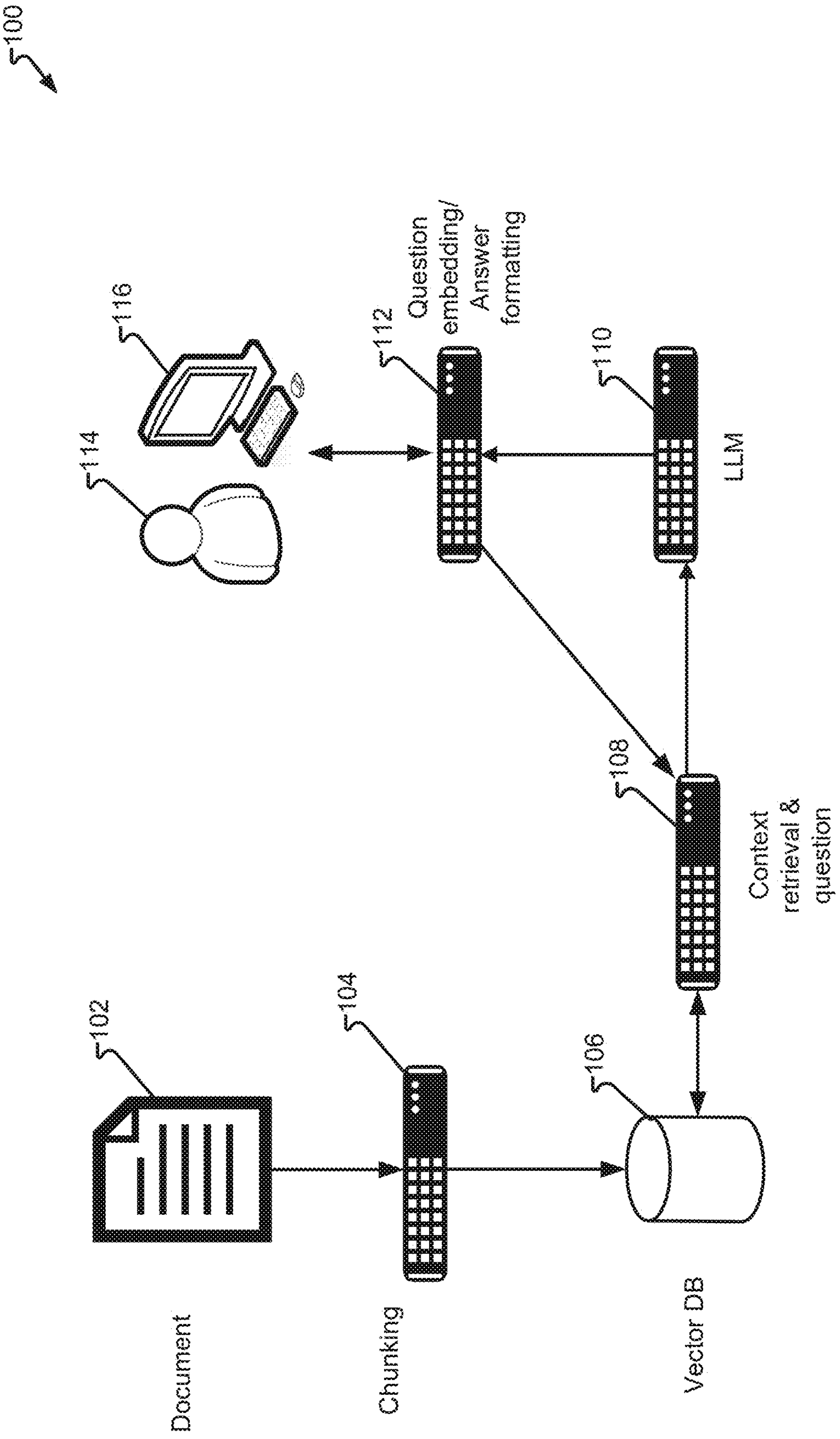
FIG. 1 depicts a system in accordance with embodiments of the present disclosure.

FIG. 1 depicts system 100 in accordance with embodiments of the present disclosure. System 100 illustrates components comprising computing components 104, 108, 110, 112, 114, 116 and a data storage component (e.g., vector database (DB) 106) interconnected, such as via a network. It should be appreciated that, in one embodiment, each of the illustrated components provides a single service. However, one of ordinary skill in the art will recognize that other topologies may be deployed without departing from the scope of embodiments herein. For example, any one component may be embodied as a plurality of components and/or any two or more components may be embodied as a single component. In one embodiment, the components as illustrated perform a single function; in other embodiments, one or more components may perform a plurality of functions and/or one or more functions may be performed by a plurality of components, including as a service (e.g., software as a service (SaaS)).

In one embodiment, system 100 accesses document 102. Document 102 may be embodied as a single document (e.g., a book, article, white paper, etc.) or as a collection of documents. Document(s) 102 may be limited to a particular domain or comprise documents across a number of different domains.

Chunking server 104 segments the document into a number of text chunks, such as a number of sentences having a common topic. Whether or not a sentence comprises a topic similar to a preceding sentence may be determined by utilizing known techniques, such as a cosine similarity test. Chunking server 104 may then utilize, in part, known chunking methodologies. Chunking server 104 may utilize multiple passes as will be discussed more completely with respect to the embodiments below (sec FIGS. 2A-2B).

User 114, utilizing device 116, such as a desktop computer, smart phone, laptop, etc., creates a question for submission to server 112. Server 112 performs any processing of the question, such as question embeddings, to present a semantic search, which may be performed by server 108, to vector database 106. Vector database 106 returns a retrieved context. The retrieved context and question from user 114 are then presented to large language model (LLM) 110. LLM 110 provides a response which may be formatted by server 112 and presented to user 114 via device 116.

Figure 2A:
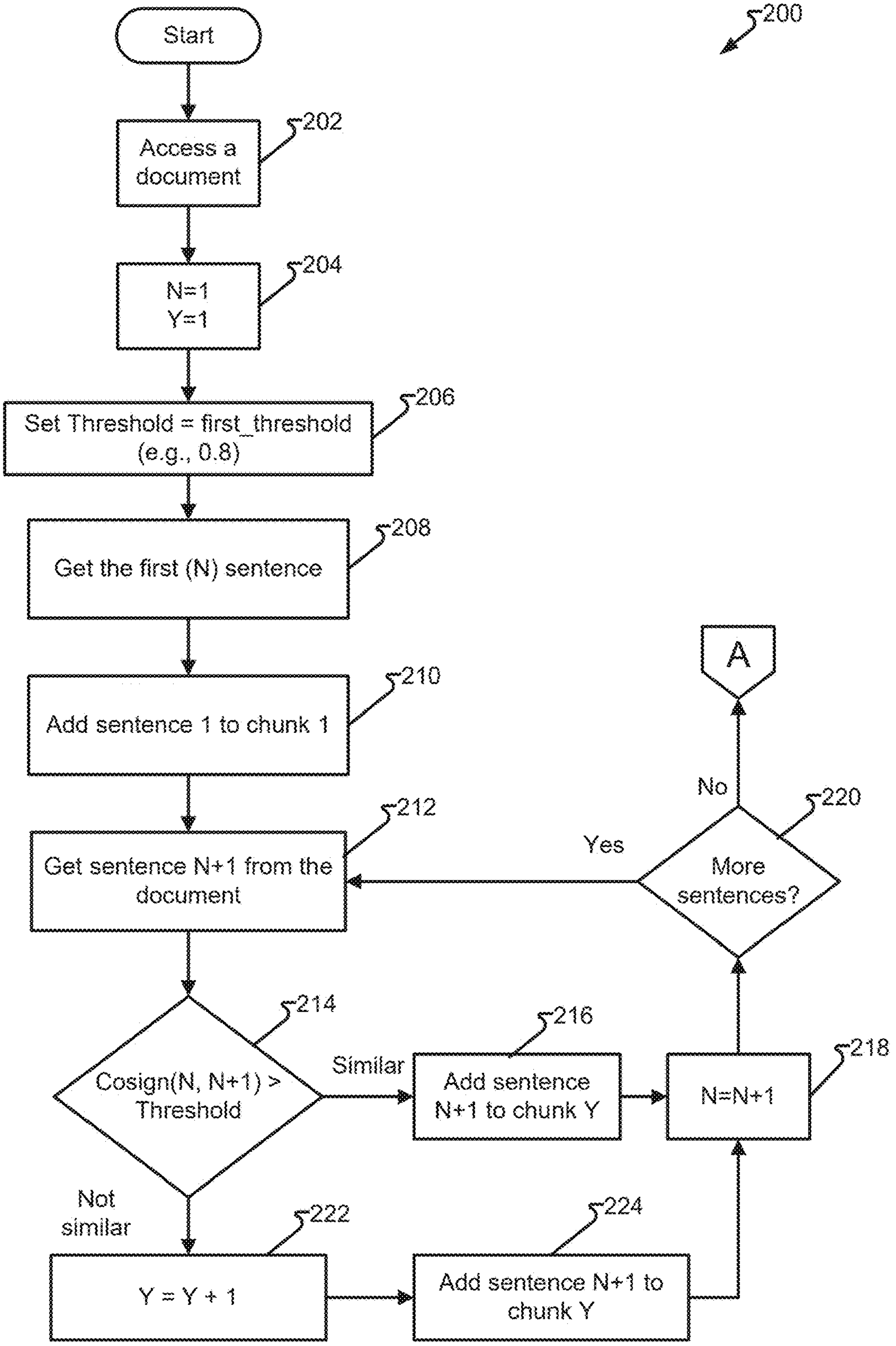
FIGS. 2A and 2B depict a process in accordance with embodiments of the present disclosure.
Figure 2B:
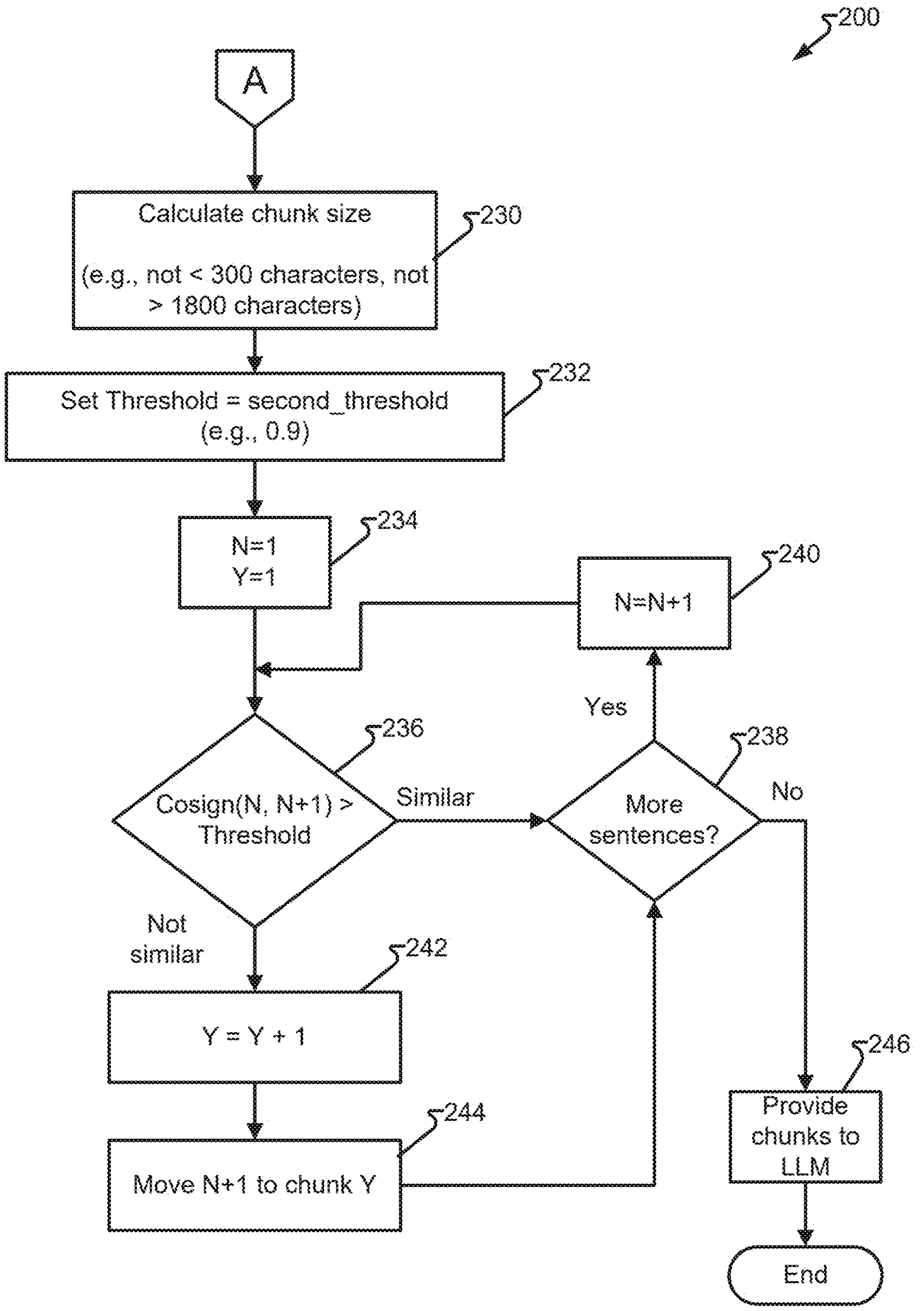

FIGS. 2A and 2B depict process 200 in accordance with embodiments of the present disclosure. In one embodiment, process 200 is embodied as machine-readable instructions maintained in a non-transitory memory that when read by a machine, such as a processor of a server, cause the machine to execute the instructions and thereby execute process 200. The processor of the server may include, but is not limited to, at least one processor of server 104, 108, 112, and/or 110.

In one embodiment, process 200 begins and, in step 202, accesses a document. The document may comprise text or another format, such as an audio file or video with audio, which is then converted to text. Step 204 sets an index associated with a particular chunk ("Y") and an index for a particular sentence ("N"). Step 206 sets a threshold used to test similarity (e.g., test 214) to a first threshold value, such as 0.8. Step 208 gets the first sentence and, in step 210, puts the first sentence into the first chunk. It should be appreciated that putting a sentence into a chunk may be embodied as populating a data record of a chunk with the sentence or an indicum of the sentence (e.g., a record number, an address, etc.).

Step 212 then gets the next (N+1) sentence from document 102, and, in test 214, determines a first similarity score by evaluating the topic of the prior sentence (sentence(N)) compared to the next sentence (sentence(N+1)). Test 214 may perform a cosine similarity score compared to the threshold to determine whether the similarity of the topics of the two sentences is at or above the threshold. If test 214 determines the topics are similar, to at least have the degree of similarity determined by the threshold, then test 214 determines the two sentences are similar, and processing continues to step 216. Otherwise, processing continues to step 222 when the sentences are not sufficiently similar.

When test 214 determines the two sentences (i.e., sentence(N) and sentence(N+1)) are similar and, in step 216 adds the next sentence (i.e., sentence(N+1)) to the current chunk (i.e., chunk(Y)). Step 218 increments the value for N and, test 220 determines if there are more sentences (i.e., sentence(N) is not null). If test 220 is determined in the affirmative, processing continues to step 212.

Returning to test 214, if test 214 determines that the sentences (i.e., sentence(N) and sentence(N+1)) are not similar, then a new topic may be determined to be present, and processing continues to step 222 wherein the value for Y is incremented and sentence(N+1) is added to chunk Y in step 224. Processing continues until there are no more sentences and, as a result, test 220 is determined in the negative and processing continues, via off-page connector A, to step 230.

Step 230 calculates a chunk size for the chunks (i.e., chunk(1) though chunk(Y)). If the chunks are larger than a threshold value, then one or more chunks are re-chunked wherein at least one sentence is moved from one chunk into another chunk, which may be an existing chunk or a newly created chunk. The process is performed until no chunk has a size greater than the threshold value. Experimental data reveals performance degrades when the number of characters in a chunk is less than 300 or more than 1800. Accordingly, chunk size is determined to comprise sentences of between 300 and 1800 characters.

Next, step 232 sets the threshold to a second threshold value that is more restrictive than the first threshold and, as a result, similarity between two sentences is less likely to be found (see test 236). Step 234 initializes an index for the sentences to the first entry (e.g., N=1) and an index of chunks to the first entry (e.g., Y=1). Test 236 determines if a second similarity score, determined from a topic similarity test that compares the similarities of sentence(N) with sentence(N+1), such as a cosign similarity value, is greater than the threshold. If test 236 determines that sentence(N) is similar, processing continues to test 238 wherein test 238 determines if there are more sentences (e.g., sentence(N+1) is not null). If test 238 is determined in the affirmative, step 240 increments the value for N and processing loops back to test 236.

If test 236 determines the sentence(N) and sentence(N+1) are not similar, then step 242 increments the chunk index and, in step 244, sentence(N+1) is rechunked by moving sentence(N+1) into the next chunk. If no next chunk exists, it may be created. Processing then continues to test 238. Once test 238 is determined in the negative, the chunks are provided to an AI language model, such as an LLM, in step 246.

Process 200 or portions thereof may be performed multiple times, such as with different values for the first and/or second thresholds in order to produce an acceptable distribution of chunk sizes.

Process 200, in part, determines if adjacent sentences are similar (e.g., sentence(N) and the next sentence in document 102, sentence(N+1)). In another embodiment, process 200 may be performed with test 214 comparing a sentence to all other sentences such that the chunks may comprise a non-contiguous chain of sentences. Additionally or alternatively, sentences may be broken up into two or more sentence portions and the sentence portions evaluated for topic similarity. For example, the words of a sentence may include parentheticals or other off-topic subject matter and be divided into sentence portions accordingly. In another embodiment, two or more sentences may be grouped together and the groupings evaluated for topic similarity, such as when the sentences are identical or nearly identical (e.g., a restating).

Figure 3:
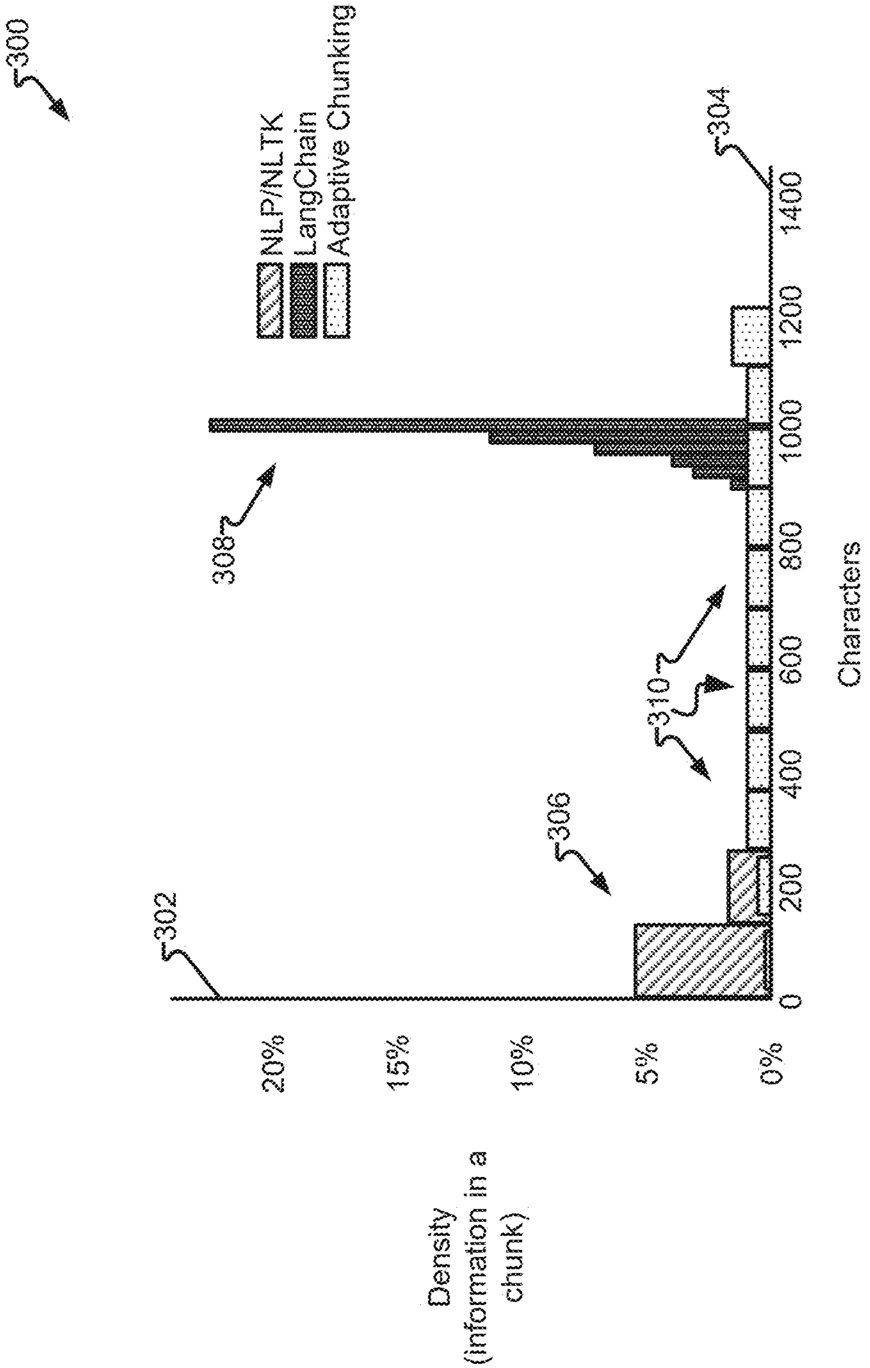
FIG. 3 depicts distributions of chunk sizes in accordance with embodiments of the present disclosure.

FIG. 3 depicts distributions 300 of chunk sizes in accordance with embodiments of the present disclosure. Distributions 300 illustrate distributions of chunk sizes 304 as a percentage, on axis 302. In first distribution 306, the majority of chunks are small in character, such as may be common with natural language processing (NPL) and natural language toolkit (NLTK). Second distribution 308 illustrates chunks having a high concentration, such as around 1000 characters per chunk, such as may be produced by LangChain. Third distribution 310 produces a relatively flat distribution across many sizes, such as may be produced by the embodiments disclosed herein.

Figure 4:
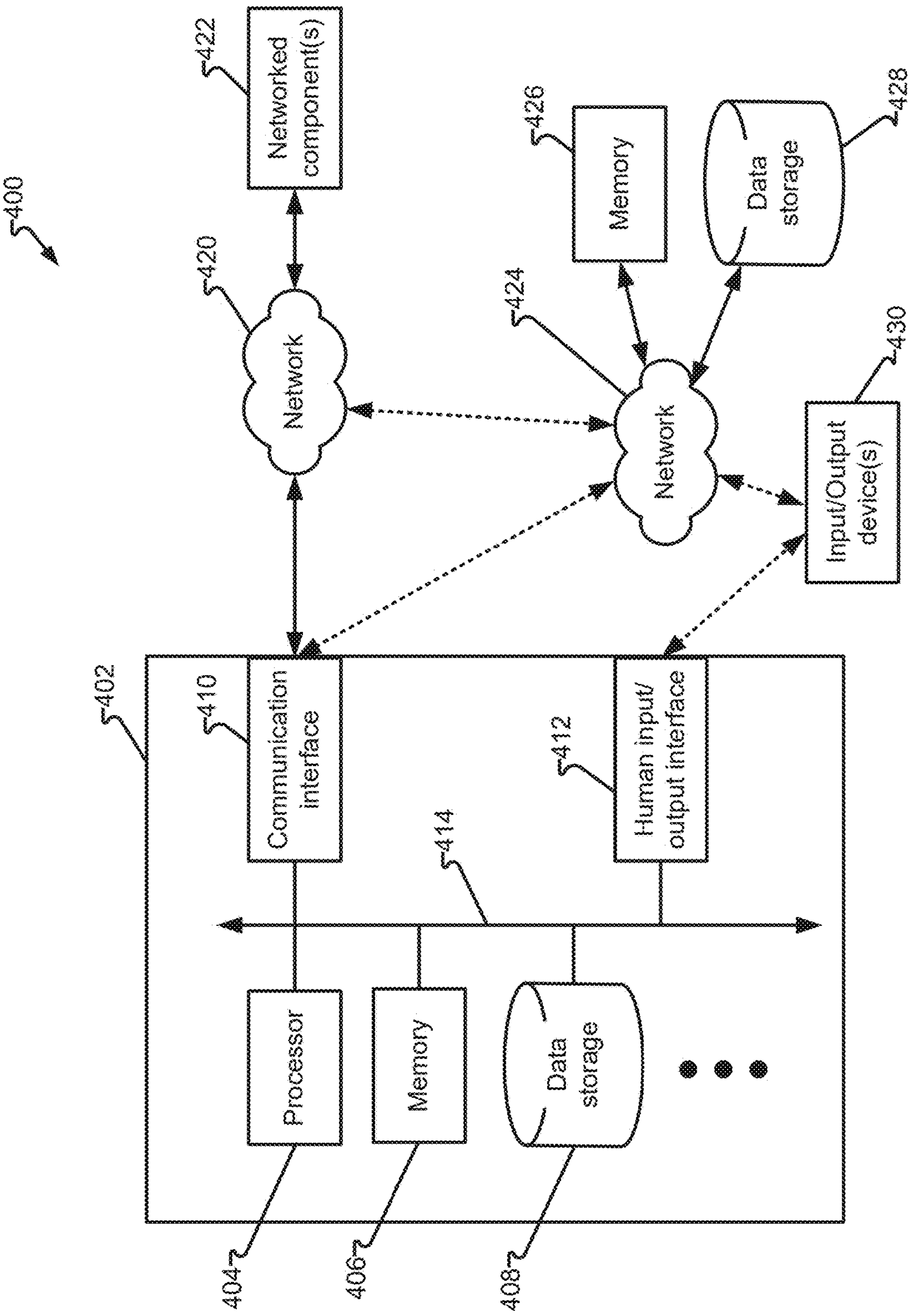
FIG. 4 depicts a device in a system in accordance with embodiments of the present disclosure.

FIG. 4 depicts device 402 in system 400 in accordance with embodiments of the present disclosure. In one embodiment, server 104, server 108, server 112, server 110 and/or device 116 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may comprise programmable logic functionality, such as determined, at least in part, from accessing machine-readable instructions maintained in a non-transitory data storage, which may be embodied as circuitry, on-chip read-only memory, computer memory 406, data storage 408, etc., that cause the processor 404 to perform the steps of the instructions. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize computer memory 406 and/or data storage 408 for the storage of accessible data, such as instructions, values, etc. Communication interface 410 facilitates communication with components, such as processor 404 via bus 414 with components not accessible via bus 414 and may be embodied as a network interface (e.g., ethernet card, wireless networking components, USB port, etc.). Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or configured to utilize one or more networks, such as network 420 and/or network 424.

Network 420 may be a wired network (e.g., Ethernet), wireless (e.g., WiFi, Bluetooth, cellular, etc.) network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.).

Additionally or alternatively, one or more other networks may be utilized. For example, network 424 may represent a second network, which may facilitate communication with components utilized by device 402. For example, network 424 may be an internal network to a business entity or other organization, whereby components are trusted (or at least more so) than networked components 422, which may be connected to network 420 comprising a public network (e.g., Internet) that may not be as trusted.

Components attached to network 424 may include computer memory 426, data storage 428, input/output device(s) 430, and/or other components that may be accessible to processor 404. For example, computer memory 426 and/or data storage 428 may supplement or supplant computer memory 406 and/or data storage 408 entirely or for a particular task or purpose, such as vector DB 106. As another example, computer memory 426 and/or data storage 428 may be an external data repository (e.g., server farm, array, "cloud," etc.) and enable device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of computer memory 406, data storage 408, computer memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, a switch, a port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMS, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:

segmenting a document into a plurality of portions;

chunking each portion of the plurality of portions into one of a plurality of chunks based on a first similarity score;

determining a chunk size for each chunk of the plurality of chunks;

upon determining the chunk size for a first chunk of the plurality of chunks is greater than a threshold size, rechunking at least one portion of the plurality of portions into a second chunk; and providing the plurality of chunks to a large language model.

2. The method of claim 1, wherein chunking each portion of the plurality of portions into one of the plurality of chunks based on the first similarity score further comprises chunking a first portion of the plurality of portions into one of the plurality of chunks based on the first similarity score compared to a second portion of the plurality of portions, wherein the first portion of the plurality of portions and the second portion of the plurality of portions are adjacent.

3. The method of claim 1, wherein chunking each portion of the plurality of portions into one of the plurality of chunks based on the first similarity score further comprises chunking a first portion of the plurality of portions into one of the plurality of chunks based on the first similarity score compared to a second portion of the plurality of portions, wherein the first portion of the plurality of portions and the second portion of the plurality of portions are separated by a third portion of the plurality of portions.

4. The method of claim 1, wherein the plurality of portions comprise a plurality of complete sentences.

5. The method of claim 1, wherein the plurality of portions comprise at least one portion having less than all words of a complete sentence.

6. The method of claim 1, wherein the plurality of portions comprise a plurality of words from at least two complete sentences.

7. The method of claim 1, wherein the first similarity score comprises a cosine similarity score.

8. The method of claim 1, wherein:

rechunking comprises chunking each portion of the first chunk of the plurality of portions into the second chunk of the plurality of chunks based on a second similarity score that is more restrictive than the first similarity score.

9. The method of claim 1, wherein the rechunking comprises chunking each portion of the first chunk of the plurality of portions into a third chunk of the plurality of chunks based on a second similarity score that is more restrictive than the first similarity score.

10. A system, comprising:

an input device;

an output device; and a computing device comprising one or more processors coupled to a computer memory comprising instructions; and wherein the instructions cause the one or more processors to perform:

segmenting a document into a plurality of portions;

chunking each portion of the plurality of portions into one of a plurality of chunks based on a first similarity score;

determining a chunk size for each chunk of the plurality of chunks;

upon determining the chunk size for a first chunk of the plurality of chunks is greater than a threshold size, rechunking at least one portion of the plurality of portions into a second chunk; and providing the plurality of chunks to a large language model.

11. The system of claim 10, wherein chunking each portion of the plurality of portions into one of the plurality of chunks based on the first similarity score further comprises chunking a first portion of the plurality of portions into one of the plurality of chunks based on the first similarity score compared to a second portion of the plurality of portions, wherein the first portion of the plurality of portions and the second portion of the plurality of portions are adjacent.

12. The system of claim 10, wherein chunking each portion of the plurality of portions into one of the plurality of chunks based on the first similarity score further comprises chunking a first portion of the plurality of portions into one of the plurality of chunks based on the first similarity score compared to a second portion of the plurality of portions, wherein the first portion of the plurality of portions and the second portion of the plurality of portions are separated by a third portion of the plurality of portions.

13. The system of claim 10, wherein the plurality of portions comprise a plurality of complete sentences.

14. The system of claim 10, wherein the plurality of portions comprise at least one portion having less than all words of a complete sentence.

15. The system of claim 10, wherein the plurality of portions comprise a plurality of words from at least two complete sentences.

16. The system of claim 10, wherein the first similarity score comprises a cosine similarity score.

17. The system of claim 10, wherein:

rechunking comprises chunking each portion of the first chunk of the plurality of portions into the second chunk of the plurality of chunks based on a second similarity score that is more restrictive than the first similarity score.

18. The system of claim 10, wherein the rechunking comprises chunking each portion of the first chunk of the plurality of portions into a third chunk of the plurality of chunks based on a second similarity score that is more restrictive than the first similarity score.

19. A non-transitory computer readable medium comprising instructions that, when read by a machine, cause the machine to perform:

segmenting a document into a plurality of portions;

chunking each portion of the plurality of portions into one of a plurality of chunks based on a first similarity score;

determining a chunk size for each chunk of the plurality of chunks;

upon determining the chunk size for a first chunk of the plurality of chunks is greater than a threshold size, rechunking at least one portion of the plurality of portions into a second chunk; and providing the plurality of chunks to a large language model.

20. The non-transitory computer readable medium of claim 19, wherein chunking each portion of the plurality of portions into one of the plurality of chunks based on the first similarity score further comprises chunking a first portion of the plurality of portions into one of the plurality of chunks based on the first similarity score compared to a second portion of the plurality of portions, wherein the first portion of the plurality of portions and the second portion of the plurality of portions are adjacent.

* * * * *